(12) United States Patent
Cimatti et al.

(10) Patent No.: US 8,281,884 B2
(45) Date of Patent: Oct. 9, 2012

(54) COOLING SYSTEM FOR A VEHICLE WITH HYBRID PROPULSION

(75) Inventors: Franco Cimatti, Pavullo (IT); Fabrizio Favaretto, Formigine (IT)

(73) Assignee: Ferrari S.p.A., Modena (IT)

( * ) Notice: Subject to any disclaimer, the term of this patent is extended or adjusted under 35 U.S.C. 154(b) by 368 days.

(21) Appl. No.: 12/731,272

(22) Filed: Mar. 25, 2010

(65) Prior Publication Data

US 2010/0243215 A1 Sep. 30, 2010

(30) Foreign Application Priority Data

Mar. 25, 2009 (IT) ............................... BO2009A0181

(51) Int. Cl.
*B60W 20/00* (2006.01)
(52) U.S. Cl. ..................................... 180/65.275; 165/42
(58) Field of Classification Search ............ 180/65.275, 180/65.27, 65.21, 68.1, 68.2, 68.3, 68.4; 165/41, 42, 51, 104.31, 287, 294, 296, 297, 165/300
See application file for complete search history.

(56) References Cited

U.S. PATENT DOCUMENTS

| | | | |
|---|---|---|---|
| 5,833,023 A | 11/1998 | Shimizu | |
| 6,032,869 A | 3/2000 | Ito et al. | |
| 6,467,286 B2* | 10/2002 | Hasebe et al. | 62/185 |
| 6,668,765 B2* | 12/2003 | Zlotek | 123/41.31 |
| 7,082,905 B2* | 8/2006 | Fukuda et al. | 123/41.31 |
| 7,100,369 B2* | 9/2006 | Yamaguchi et al. | 60/324 |
| 7,263,954 B2* | 9/2007 | Piddock et al. | 123/41.09 |
| 7,409,927 B2* | 8/2008 | Wenderoth et al. | 123/41.01 |
| 8,151,917 B2* | 4/2012 | Suzuki | 180/65.275 |
| 2002/0073726 A1* | 6/2002 | Hasebe et al. | 62/323.1 |
| 2004/0163861 A1 | 8/2004 | Fukuda et al. | |
| 2004/0216700 A1* | 11/2004 | Hutchins | 123/41.08 |
| 2007/0074515 A1* | 4/2007 | Yoshino | 60/670 |
| 2007/0277523 A1* | 12/2007 | Muller et al. | 60/599 |
| 2009/0000779 A1* | 1/2009 | Hickam et al. | 165/299 |
| 2009/0229542 A1* | 9/2009 | Haas et al. | 123/41.1 |
| 2010/0126438 A1* | 5/2010 | Kim | 123/41.21 |
| 2011/0000241 A1* | 1/2011 | Favaretto | 62/244 |
| 2011/0132291 A1* | 6/2011 | Ulrey et al. | 123/41.1 |
| 2011/0174243 A1* | 7/2011 | Adam et al. | 123/41.1 |
| 2011/0184599 A1* | 7/2011 | Cimatti et al. | 701/22 |
| 2011/0198070 A1* | 8/2011 | Riccardo et al. | 165/287 |
| 2011/0214627 A1* | 9/2011 | Nishikawa et al. | 123/41.02 |
| 2012/0018118 A1* | 1/2012 | Cimatti et al. | 165/41 |
| 2012/0085157 A1* | 4/2012 | Nishigaki | 73/114.68 |
| 2012/0106590 A1* | 5/2012 | Suzuki | 374/1 |
| 2012/0125013 A1* | 5/2012 | Akiyama et al. | 62/3.2 |

FOREIGN PATENT DOCUMENTS

DE 197 30 678 A 1 1/1999

(Continued)

*Primary Examiner* — J. Allen Shriver, II
*Assistant Examiner* — Brodie Follman
(74) *Attorney, Agent, or Firm* — Oblon, Spivak, McClelland, Maier & Neustadt, L.L.P.

(57) ABSTRACT

A cooling system for a vehicle with hybrid propulsion; the cooling system is provided with a hydraulic circuit, inside which a cooling fluid flows, and has: a main branch, which carries out the cooling of a heat engine and comprises at least a first pump mechanically operated by the heat engine, and at least one radiator which is hit by air when the vehicle is moving; and a secondary branch, which is connected in parallel to the main branch by means of a starting offtake and an arrival offtake, has no heat exchangers of the water/air type, carries out the cooling of a reversible electric machine which may be mechanically connected to the driving wheels, and of a first electronic power converter which controls the electric machine, and comprises at least a second pump electrically operated.

15 Claims, 4 Drawing Sheets

FOREIGN PATENT DOCUMENTS

| | | |
|---|---|---|
| DE | 199 16 313 A1 | 10/1999 |
| DE | 199 60 960 C1 | 4/2006 |
| EP | 0 949 095 A1 | 10/1999 |
| EP | 1 396 370 A1 | 3/2004 |
| EP | 1 669 570 A2 | 6/2006 |
| FR | 2 815 402 | 4/2002 |

* cited by examiner

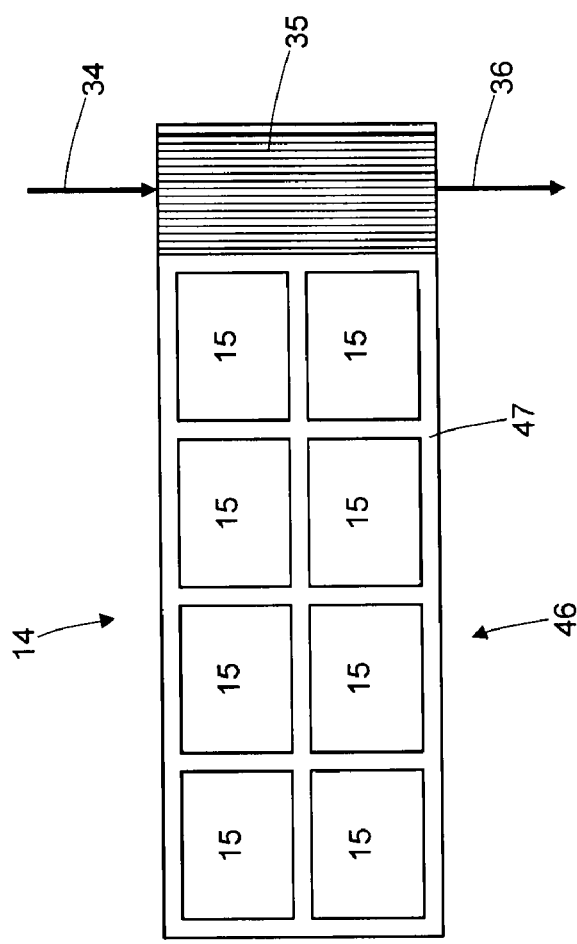
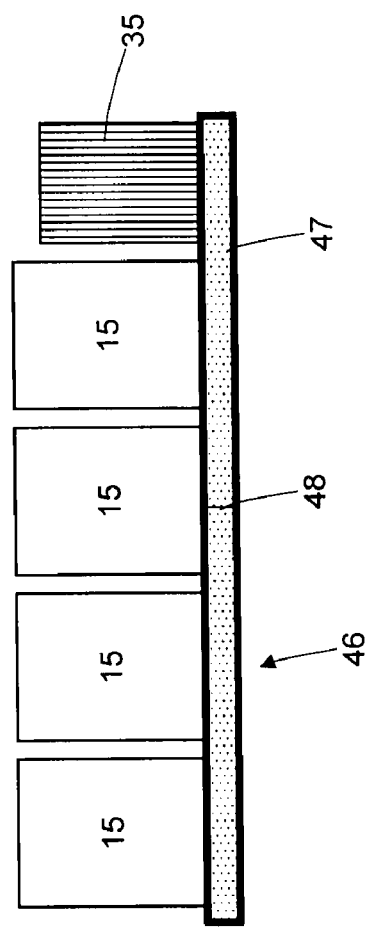

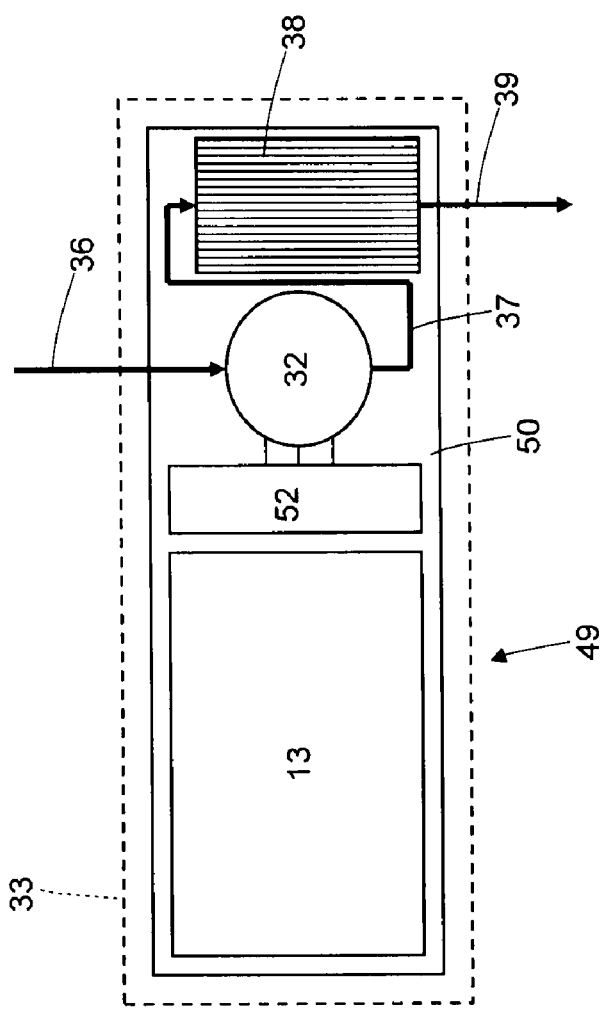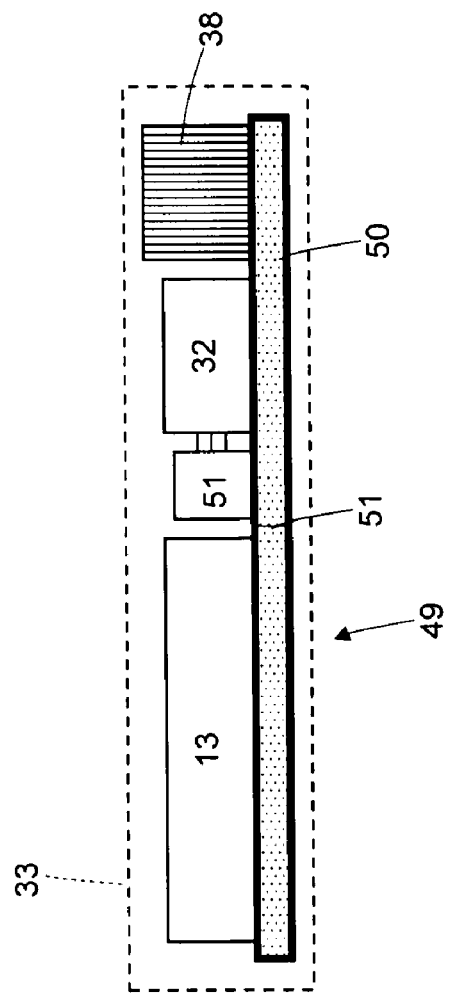

COOLING SYSTEM FOR A VEHICLE WITH HYBRID PROPULSION

TECHNICAL FIELD

The present invention relates a cooling system for a vehicle with hybrid propulsion.

PRIOR ART

A hybrid vehicle comprises an internal combustion engine, which transmits the driving torque to the driving wheels by means of a transmission provided with a gearbox, and at least one electric machine which is supplied by an electronic power converter mechanically connected to the driving wheels. The electric machine is controlled by an electric drive connected to an electric storage system typically consisting of a chemical battery pack possibly connected in parallel to one or more supercapacitors.

When the vehicle is travelling, the following is possible: a heat operating mode, in which the driving torque is generated only by the combustion engine and the electric machine possibly operates as a generator to recharge the electric storage system; an electric operating mode, in which the combustion engine is switched off and the driving torque is generated only by the electric machine operating as an engine; or a combined operating mode, in which the driving torque is generated both by the combustion engine and by the electric machine operating as an engine. Moreover, in order to increase the overall energy efficiency during all steps of deceleration, the electric machine may be used as a generator to achieve a regenerative deceleration in which the kinetic energy held by the vehicle is partially converted into electric energy which is stored in the electric storage system, rather than being completely dissipated into friction.

A hybrid vehicle comprises a cooling system, which should be capable of cooling both the heat engine, and the electric machine and the relative electronic power converter. In known hybrid vehicles, the cooling system is generally complex and cumbersome, and is not capable of offering efficient cooling of all components in all possible operating circumstances.

Patent DE19960960C1 describes a cooling system for a vehicle with hybrid propulsion; the cooling system is provided with a hydraulic circuit, inside which a cooling fluid flows, and has: a main branch, which carries out the cooling of a heat engine and comprises a first pump mechanically operated by the heat engine, and a radiator which is hit by air when the vehicle is moving; and a secondary branch, which is connected in parallel to the main branch by means of a starting offtake and an arrival offtake, has no radiators, carries out the cooling of an electronic power converter which controls a reversible electric machine which may be mechanically connected to the driving wheels, and comprises a second pump electrically operated.

DESCRIPTION OF THE INVENTION

It is the object of the present invention to provide a cooling system for a vehicle with hybrid propulsion, which is free from the above-described drawbacks while being easy and cost-effective to be implemented.

According to the present invention, a cooling system for a vehicle with hybrid propulsion is provided as claimed by the attached claims.

BRIEF DESCRIPTION OF THE DRAWINGS

The present invention will now be described with reference to the accompanying drawings, which illustrate some non-limiting embodiment thereof, in which:

FIG. 3 is a diagrammatic top view, with parts removed for clarity, of a storage system of the vehicle in FIG. 1;

FIG. 4 is a diagrammatic cross-section view, with parts removed for clarity, of the storage system in FIG. 3;

FIG. 5 is a diagrammatic top view, with parts removed for clarity, of an electronic power converter of the vehicle in FIG. 1; and FIG. 6 is a diagrammatic cross-section view, with parts removed for clarity, of the electronic power converter in FIG. 5.

PREFERRED EMBODIMENTS OF THE INVENTION

Figure 1:
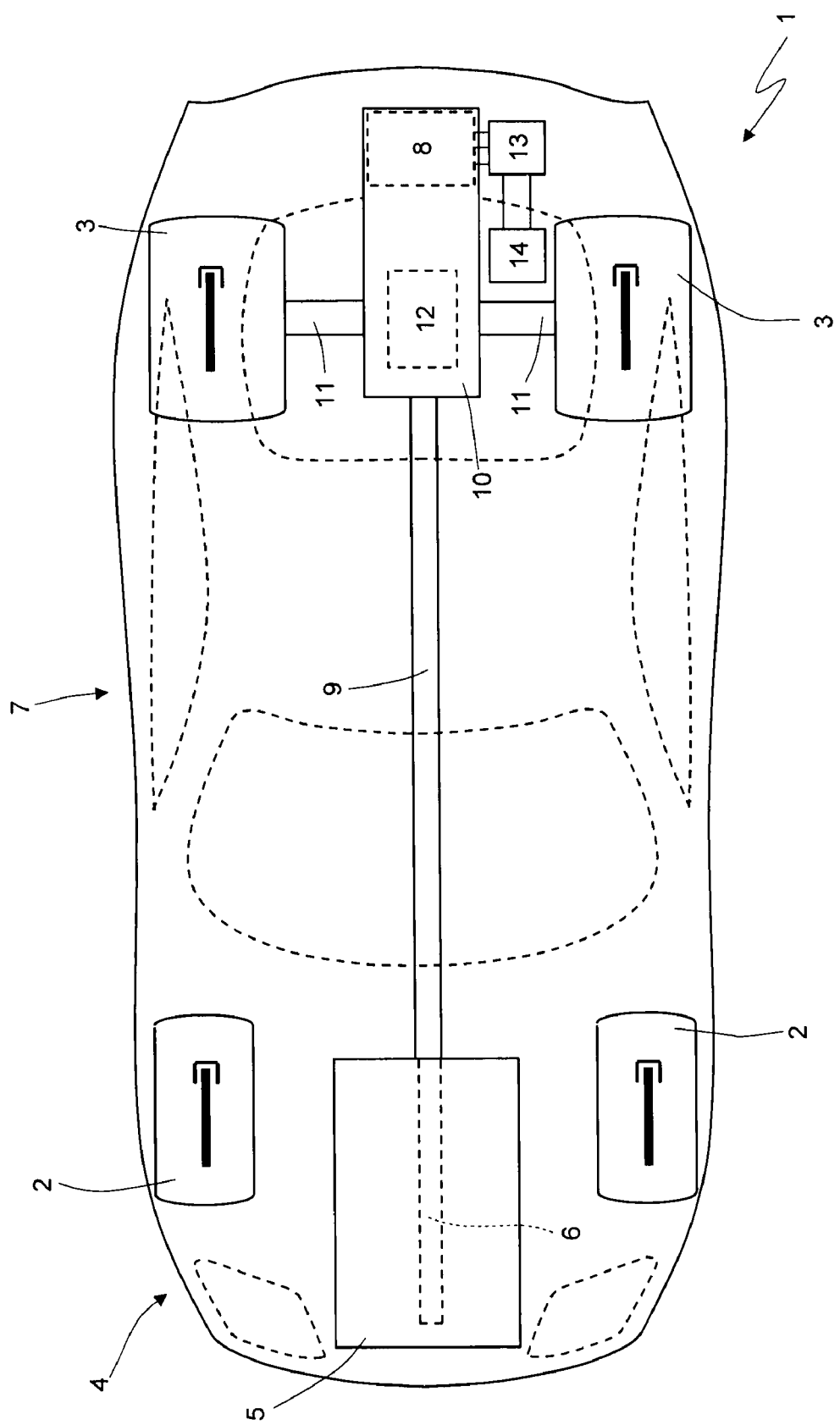
FIG. 1 is a diagrammatic top view, with parts removed for clarity, of a hybrid vehicle provided with a cooling system in accordance with the present invention.

In FIG. 1, numeral 1 indicates as a whole a cooling system for a vehicle with hybrid propulsion provided with two front wheels 2 and two rear driving wheels 3, which receive the driving torque from a hybrid motor propulsion system 4.

The hybrid motor propulsion system 4 comprises an internal combustion heat engine 5, which is arranged in a forward position and is provided with a drive shaft 6, a servo-controlled transmission 7, which transmits the driving torque generated by the internal combustion engine 5 towards the rear driving wheels 3, and a reversible electric machine 8 (i.e. that may operate both as an electric engine by absorbing electric energy and generating a mechanical driving torque, and as an electric generator by absorbing mechanical energy and generating electric energy) which is mechanically connected to the servo-controlled transmission 7.

The servo-controlled transmission 7 comprises a transmission shaft 9 which, on the one hand, is angularly integral with the drive shaft 6 and, on the other hand, is mechanically connected to a gearbox 10, which is arranged in a rear position and transmits the motion to the rear driving wheels 3 by means of two axle shafts 11 which receive the motion from a differential 12. The reversible electric machine 8 is mechanically connected to the gearbox 10 and is controlled by an electronic power converter 13 connected to a storage system 14, which is suited for storing electric energy and comprises a series of storage devices 15 (shown in detail in FIGS. 3 and 4) consisting of chemical batteries and/or supercapacitors.

Figure 2:
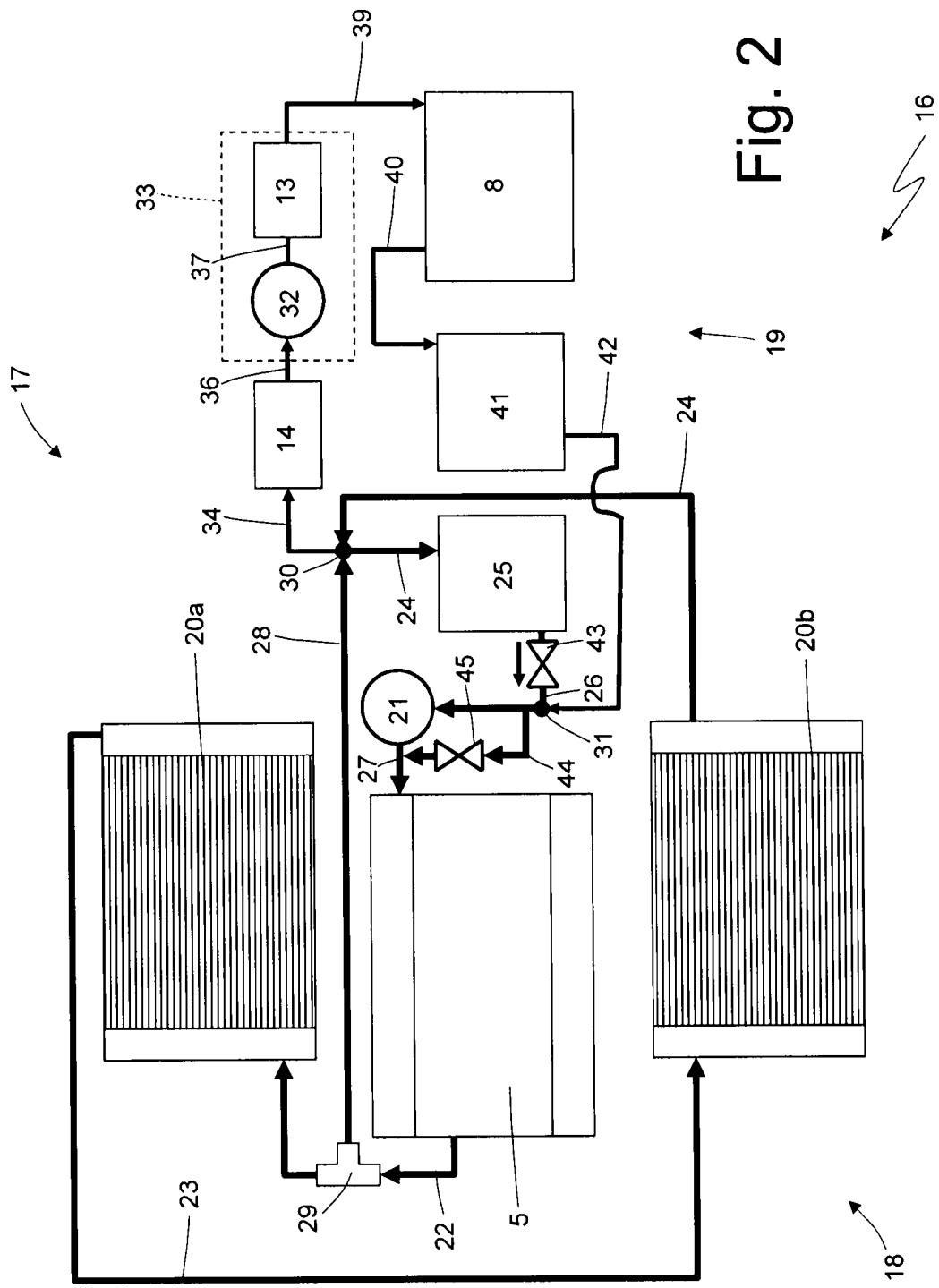
FIG. 2 is a diagrammatic view of the cooling system of the vehicle in FIG. 1.

As shown in FIG. 2, vehicle 1 comprises a cooling system 16, which serves the task of cooling heat engine 5, gearbox 10, electric machine 8, electronic power converter 13, and storage system 14.

The cooling system 16 comprises a hydraulic circuit inside of which a cooling fluid flows, which typically consists of water mixed to an antifreeze additive. The hydraulic circuit 17 comprises a main branch 18, which is located in a forward position and carries out the cooling of the heat engine 5, and a secondary branch 19 which is located in a rear position, is connected in parallel to the main branch 18, and carries out the cooling of gearbox 10, electric machine 10, electronic power converter 13, and storage system 14.

The main branch 18 comprises two radiators 20 (i.e. two heat exchangers 20 of the water/air type), which are arranged in a forward position to be hit by air when vehicle 1 is moving, and are connected to each other in series (i.e. the cooling fluid first crosses one radiator 20a and then crosses the other radiator 20b); alternatively, the two radiators 20 could be connected to each other in series or a single radiator 20 could be provided. Moreover, the main branch 18 comprises a mechanically operated pump 21, which determines the circulation of the cooling fluid along the main branch and is directly operated by the drive shaft 6 of engine 5.

The main branch 18 comprises a pipe 22 which connects an output of a cooling labyrinth of the engine block of engine 5 to an input of radiator 20a, a pipe 23 which connects an output of radiator 20a to an input of radiator 20b, a pipe 24 which connects an output of radiator 20b to an input of one exchanger 25 of the water/oil type which cools down the lubrication oil of the heat engine 5, a pipe 26 which connects an output of exchanger 25 with an input of pump 21, and a pipe 27 which connects an output of pump 21 to an input of the cooling labyrinth of the engine block of engine 5.

According to a preferred embodiment, the main branch 18 comprises a bypass duct 28, which is regulated by an electronically controlled, three-way bypass valve 29, and is placed parallel to the two radiators 20 (alternatively, the bypass valve 29 may be thermostatic). When the bypass valve 29 is closed, the cooling liquid flows through the radiators 20, whereas when the bypass valve 29 is open, it flows through the bypass duct 28 and does not flow through the radiators 20. The bypass valve 29 is controlled according to the cooling liquid temperature which is measured by a temperature sensor (known and not shown) arranged along the main branch 18 of the hydraulic circuit 17. When the temperature of the cooling liquid is below a minimum threshold value (i.e. when vehicle 1 is "cold"), the bypass valve 29 is opened to avoid the cooling fluid from crossing through radiators 20 and therefore to hold the most heat possible produced within vehicle 1, so as to accelerate the heating; instead, when the temperature of the cooling liquid is above the minimum threshold value (i.e. when vehicle 1 is "hot"), the bypass valve 29 is closed to circulate the cooling fluid inside the radiators 20 so as to allow the heat produced within vehicle 1 to be dispersed into the external environment.

The secondary branch 19 is connected in parallel to the main branch 18, has no radiators (therefore it uses the radiators 20 of the main branch 18), originates from a starting offtake 30 arranged along pipe 24 upstream from the exchanger 25 which cools down the lubrication oil of the heat engine 5, and ends at an arrival offtake 31 arranged along the pipe 26 upstream of pump 21. The secondary branch 19 comprises an electrically operated pump 32, which determines the circulation of the cooling fluid along the secondary branch 19 and, according to a preferred embodiment, is integrated with the electronic power converter 13 to form a single unit housed in a common case 33.

Moreover, the secondary branch 19 comprises a pipe 34 which connects the starting offtake 30 to an input of a heat exchanger 35 (shown in FIGS. 3 and 4) of the storage system 14, a pipe 36 which connects an output of the heat exchanger 35 to an input of pump 32, a pipe 37 which connects an output of pump 32 to an input of a heat exchanger 38 (shown in FIGS. 5 and 6) of the electronic power converter 13, a pipe 39 which connects an output of the heat exchanger 38 to an input of a cooling labyrinth of the electric machine 8, a pipe 40 which connects an output of the cooling labyrinth of the electric machine 8 to an input of a heat exchanger 41 of the water/oil type, which cools down the lubrication oil of the gearbox 10, and a pipe 42 which connects an output of the heat exchanger 41 to the arrival offtake 31.

A nonreturn valve 43 (i.e. a single-acting valve) is arranged along pipe 26 and upstream of the arrival offtake 31 (i.e. between the output of the exchanger 25 and the arrival offtake 31), which only permits the cooling fluid to flow from the exchanger 25 towards the pump 21 and not vice versa; more generally, the nonreturn valve 43 is arranged between the starting offtake 30 and the arrival offtake 31 and permits the cooling fluid to flow along the main branch 18 only from the starting offtake 30 to the arrival offtake 31 and not vice versa. The nonreturn valve 43 serves the function of preventing the cooling fluid from being able to travel from the arrival offtake 31 to the starting offtake 30 through the exchanger 25, thus bypassing the radiators 20, when only pump 32 is working.

According to a preferred embodiment, a bypass circuit 44 which is regulated by an electronically controlled, two-way valve 45, is arranged parallel to the pump 21. Valve 45 is closed when the heat engine 5 is switched on (and therefore the pump 21 mechanically operated by the drive shaft 6 is working) to prevent the cooling fluid from flowing through the bypass circuit 44, thus permitting the proper operation of the pump 21 itself; instead, valve 45 is opened when the heat engine is switched off (and therefore the pump 21 mechanically operated by the drive shaft 6 is stopped) to permit the cooling fluid to circulate through the bypass circuit 44 thus avoiding heavy load losses imposed by the stopped pump 21. Alternatively to the bypass circuit 44, a pump 21 may be implemented, which when it is stopped, has reduced load losses for crossing the same.

When engine 5 is on, the circulation of the cooling fluid through the main branch 18 is essentially ensured by the pump 21 which is mechanically operated by the drive shaft 6, thus operating continuously (i.e. without breaks). When engine 5 is on, the circulation of the cooling fluid through the secondary branch 19 is related to the intervention by the electrically operated pump 32, which is switched on when needed, i.e. when transferring heat from at least one of the components of the secondary branch 19 towards the main branch 18 (or even vice versa) is desired. In other words, when pump 32 is off, the circulation of the cooling fluid through the secondary branch 19 is very limited, as the cooling fluid pushed by the pump 21 encounters much less hydraulic resistance in flowing from the starting offtake 30 to the arrival offtake 31 through the exchanger 25, rather than through the secondary branch 19 (also consider that the pump 32 being off is a further obstacle to the circulation of the cooling fluid). In order to have a minimum circulation of the cooling fluid through the secondary branch 19 even when the pump 32 is off, it is convenient that pump 32 is provided so as to offer the minimum hydraulic resistance possible when it is off. Pump 32 is switched on when there is a need to transfer heat from at least one of the components of the secondary branch 19 towards the main branch 18 (or even vice versa); such a heat transfer from at least one of the components of the secondary branch 19 towards the main branch 18 (or even vice versa) may be aimed at cooling at least one of the components of the secondary branch 19 (thus transferring heat to the radiators 20), may be aimed at heating the components of the main branch 18 (obviously when vehicle 1 is cold, i.e. the cooling liquid temperature is below the minimum threshold value), or may be aimed at heating the components of the secondary branch 19.

In addition to transferring the heat from at least one of the components of the secondary branch 19 towards the main branch 18, pump 32 may also be switched on to increase the circulation of the cooling fluid along the main branch 18 so as to maximize the heat exchange between the heat engine 5 and the radiators 20 when the temperature of the heat engine 5 is particularly high; in other words, pump 32 may be used to increase the action of pump 21 in the case of thermal peaks of the heat engine 5.

When the heat engine 5 is off, the pump 21 is stopped (therefore it is normally bypassed by opening the bypass valve 45) and the circulation of the cooling fluid through the hydraulic circuit 17 is allocated to pump 32 only, which is switched on as required, typically when there is a need to transfer heat from at least one of the components of the secondary branch 19 towards the main branch 18 to cool down at least one of the components of the secondary branch 19 and/or to keep the components of the main branch 18 hot.

As shown in FIGS. 3 and 4, the storage system 14 comprises a heat pipe 46 which is flat in shape and consists of a hollow body 47 made of heat conducting metal (typically copper or aluminium), containing a small quantity of cooling substance 48 (e.g. water, ethanol or ammonia) in liquid state, while the rest of the hollow body 47 is filled with the vapour of the cooling substance 48 so that no other gases are present. The heat pipe 46 transfers the heat from one hot end to the other cold end by evaporating and condensing the cooling substance 48. The hot end, in contact with a heat source, releases heat to the liquid cooling substance 48 which vaporizes, therefor increasing the vapour pressure in the hollow body 47; moreover, the latent vaporization heat absorbed by the liquid cooling substance 48 decreases the temperature at the hot end. The pressure of the vapour cooling substance 48 close to the hot end is higher than the equilibrium thereof at the cold end, hence this difference in pressure results in a very fast transfer of vapour cooling substance 48 towards the cold end, where the vapour cooling substance 48 condenses exceeding the equilibrium, thus releasing heat to the cold end. Hence, the liquid cooling substance 48 flows back to the hot end: if the heat pipe is vertically oriented (with the hot end at the bottom), the force of gravity could be sufficient, otherwise the capillary action of the walls of the hollow body 47 which should be adequately shaped, is exploited. In other words, the internal walls of the hollow body 47 are made in order to promote the capillary rising action of the liquid cooling substance 48; this is achieved, for example, by means of the sintered application of powdered metal onto the internal walls of the hollow body 47, or by obtaining a series of longitudinal grooves on the internal walls of the hollow body 47.

An upper wall of the heat pipe 46 is arranged in contact with the storage devices 15 so as to promote a direct heat exchange (i.e. by conduction) between the heat pipe 46 and the storages devices 15; moreover, the upper wall of the heat pipe 46 is arranged in contact with the heat exchanger 35 so as to promote a direct heat exchange (i.e. by conduction) between the heat pipe 46 and the heat exchanger 35.

It is a first function of the heat pipe 46 to balance the temperature of the storage devices 15, i.e. to ensure all storage devices 15 have the same temperature; such a condition is particularly important in case of chemical lithium batteries, as if a storage device 15 has a higher temperature than the others, it would undergo particularly high electrochemical stresses which could also cause irreparable damages. Moreover, it is a second function of the heat pipe 46 to transfer heat from one end (hot) at the storage devices 15 to the other end (cold) at the heat exchanger 35.

It is worth noting that the heat pipe 46 is very efficient in transferring heat, more efficient than a solid copper plate having the same section. Moreover, the heat pipe 46 may be particularly thin (the thickness may even be just a few millimeters) and therefore very light (as it is entirely hollow). In an alternative, simpler embodiment with less performance, the heat pipe 46 may be replaced by a similar solid plate made of heat conducting metal.

According to a possible embodiment, a layer of material, which is heat conducting and electrically insulating, may be interposed between each storage device 15 and the upper wall of the heat pipe 46, so as to increase the electric insulation between the storage devices 15 and the heat pipe 46.

As shown in FIGS. 5 and 6, the common case 33 of pump 32 and electronic power converter 13 comprises a heat pipe 49 which is flat in shape and consists of a hollow body 50 made of heat conducting metal (typically copper or aluminium), containing a small quantity of cooling substance 51 (e.g. water, ethanol or ammonia) in liquid state, while the rest of the hollow body 50 is filled with the vapour of the cooling substance 51, so that no other gases are present. The heat pipe 49 is entirely similar to the heat pipe 46 previously described, therefore refer to the above disclosure about the heat pipe 46 for a more detailed description of the heat pipe 49.

The electronic power converter 13 of the electric machine 8, an electronic power converter 52 of the pump 32, the pump 32 and the heat exchanger 38 are resting against an upper wall of the hollow body 50; alternatively, pump 32 could be arranged adjacent the heat pipe 49. It is the function of the heat pipe 49 to transfer heat from one end (hot) at the electronic power converters 13 and 52 to the other end (cold) at the heat exchanger 38.

Also in this case, in an alternative simpler embodiment with less performance, the heat pipe 49 may be replaced by a similar solid plate made of heat conducting metal. Moreover, according to a possible embodiment, a layer of material which is heat conducting and electrically insulating, may be interposed between the electronic power converters 13 and 52 and the upper wall of the heat pipe 49 so as to increase the electric insulation between the electronic power converters 13 and 52 and the heat pipe 46.

Housing the pump 32 (and the corresponding electronic power converter 52) together with the electronic power converter 13 in a single common case 33 permits to optimize the volumes and especially permits to minimize the electrical connections; in other words, the electronic power converter 13 is obviously electrically connected to the storage system 14, and therefore providing a further electrical connection between the electronic power converter 52 and the storage system 14 is not required.

According to a different embodiment (not shown), an on-off valve may be provided along the secondary branch 19, which on-off valve is electronically controlled to interrupt the secondary branch 19 when the circulation of the cooling fluid through the secondary branch 19 itself is not desired.

The above-described cooling system 16 has several advantages, as it is simple and cost-effective to be implemented, has a contained overall volume, and is especially capable of offering an efficient cooling of all components in all the possible operating circumstances.

The invention claimed is:

1. Cooling system for a vehicle with hybrid propulsion; the cooling system comprises a hydraulic circuit, inside which a cooling fluid flows, and presents:

a main branch which carries out the cooling of a heat engine and comprises at least a first pump, mechanically operated by the heat engine, and at least one radiator, which is hit by air when the vehicle is moving; and a secondary branch which is parallel connected to the main branch by means of a starting offtake and an arrival offtake, has no radiators, carries out the cooling of a first electronic power converter controlling a reversible electric machine which can be mechanically connected to the driving wheels, and comprises at least a second pump operated electrically;

wherein the main branch comprises a nonreturn valve which is placed between the starting offtake and the arrival offtake, and allows the cooling fluid to flow along the main branch only from the starting offtake to the arrival offtake and not vice versa;

the cooling system is characterised in that the second pump operated electrically is integrated with the first electronic power converter in order to form a single unit housed in a common case.

2. Cooling system according to claim 1, wherein the secondary branch carries out also the cooling of the electric machine.

3. Cooling system according to claim 1, wherein the secondary branch carries out also the cooling of a storage system which is suited for storing electric energy, is connected to the first electronic power converter and comprises at least one storage device.

4. Cooling system according to claim 3, wherein:

the storage system comprises a first heat pipe which is flat-shaped and consists of a hollow body made of heat conducting metal and containing a small quantity of cooling substance in liquid state, while the rest of the hollow body is filled by the vapour of the cooling substance; and an upper wall of the first heat pipe is arranged in contact with the storage device and is arranged in contact with a first heat exchanger inside which the cooling fluid, that circulates along the secondary branch, flows.

5. Cooling system according to claim 4, wherein a layer of material, which is heat conducting and electrically insulating, is interposed between the storage device and the upper wall of the heat pipe.

6. Cooling system according to claim 1, wherein the common case of the second pump and of the first electronic power converter comprises a second heat pipe which is flat-shaped and consists of a hollow body made of heat conducting metal and containing a small quantity of cooling substance in liquid state, while the rest of the hollow body is filled by the vapour of the cooling substance; and an upper wall of the second hollow body is arranged in contact with the first electronic power converter of the electric machine, is arranged in contact with a second electronic power converter of the second pump, and is arranged in contact with a second heat exchanger inside which the cooling fluid, that circulates along the secondary branch, flows.

7. Cooling system according to claim 6, wherein a layer of material, which is heat conducting and electrically insulating, is interposed between the two electronic power converters and the upper wall of the second heat pipe.

8. Cooling system according to claim 1, wherein the main branch comprises a first bypass duct which is placed parallel to the radiator and is regulated by a first three-way bypass valve, which is controlled according to the temperature of the cooling liquid.

9. Cooling system according to claim 1, wherein the main branch comprises a second bypass circuit which is placed parallel to the first pump and is regulated by a second two-way valve, which is opened when the heat engine is switched off and is closed when the heat engine is switched on.

10. Cooling system according to claim 1, wherein the secondary branch comprises a first heat exchanger of the type water/oil which cools the lubrication oil of a gearbox of the vehicle.

11. Cooling system according to claim 1, wherein the main branch comprises a second heat exchanger of the type water/oil which cools the lubrication oil of the heat engine.

12. Cooling system according to claim 11, wherein the second heat exchanger is arranged between the starting offtake and the arrival offtake.

13. Cooling system according to claim 1, wherein the secondary branch comprises an on-off valve which is controlled electronically to interrupt the secondary branch, so that the cooling fluid is prevented from circulating inside the secondary branch.

14. Cooling system for a vehicle with hybrid propulsion; the cooling system comprises a hydraulic circuit, inside which a cooling fluid flows, and presents:

a main branch which carries out the cooling of a heat engine and comprises at least a first pump, mechanically operated by the heat engine, and at least one radiator, which is hit by air when the vehicle is moving; and a secondary branch which is parallel connected to the main branch by means of a starting offtake and an arrival offtake, has no radiators, carries out the cooling of a first electronic power converter controlling a reversible electric machine which can be mechanically connected to the driving wheels, and comprises at least a second pump operated electrically;

wherein the main branch comprises a nonreturn valve which is placed between the starting offtake and the arrival offtake, and allows the cooling fluid to flow along the main branch only from the starting offtake to the arrival offtake and not vice versa;

the cooling system is characterised in that the main branch comprises a bypass circuit which is placed parallel to the first pump and is regulated by a two-way valve, which is opened when the heat engine is switched off and is closed when the heat engine is switched on.

15. Cooling system for a vehicle with hybrid propulsion; the cooling system comprises a hydraulic circuit, inside which a cooling fluid flows, and presents:

a main branch which carries out the cooling of a heat engine and comprises at least a first pump, mechanically operated by the heat engine, and at least one radiator, which is hit by air when the vehicle is moving; and a secondary branch which is parallel connected to the main branch by means of a starting offtake and an arrival offtake, has no radiators, carries out the cooling of a first electronic power converter controlling a reversible electric machine which can be mechanically connected to the driving wheels, and comprises at least a second pump operated electrically;

wherein the main branch comprises a nonreturn valve which is placed between the starting offtake and the arrival offtake, and allows the cooling fluid to flow along the main branch only from the starting offtake to the arrival offtake and not vice versa;

the cooling system is characterised in the main branch comprises a second heat exchanger of the type water/oil which cools the lubrication oil of the heat engine and is arranged between the starting offtake and the arrival offtake.

* * * * *